United States Patent [19]

Cidade

[11] 3,906,192

[45] Sept. 16, 1975

[54] CARD USED ON ELECTRONIC COMPUTER FOR RECORDING AND COLLECTION OF DATA INTENDED FOR BETTING CONTESTS AND SIMILAR CONTESTS

[76] Inventor: Humberto Jose De Carvalho Cidade, Rua Tocantins, 8 Saco de Sao Francisco, Niteroi, Rio de Janeiro, Brazil

[22] Filed: Feb. 15, 1974

[21] Appl. No.: 442,842

[52] U.S. Cl. .......... 235/61.12 R

[51] Int. Cl.² .......... G06K 19/06; G06K 21/00

[58] Field of Search .......... 235/61.12 R, 61.12 M, 61.12 N, 235/61.11 E, 61.11 D; 194/4 F

[56] References Cited

UNITED STATES PATENTS

| | | | |
|---|---|---|---|
| 3,526,562 | 9/1970 | Dahl | 235/61.12 R |
| 3,553,440 | 1/1971 | Dale | 235/61.12 R |
| 3,602,696 | 8/1971 | Joyce | 235/61.12 R |
| 3,708,656 | 1/1973 | Fielder | 235/61.12 R |
| 3,790,757 | 2/1974 | Shaw | 235/61.12 R |

*Primary Examiner*—Daryl W. Cook
*Assistant Examiner*—Robert M. Kilgore
*Attorney, Agent, or Firm*—Emory L. Groff, Jr.

[57] ABSTRACT

A Hollerith type punch card is provided with a serration extending transversely thereof from one edge to the other to provide a two part card. One part has identical spacing and arrangement of at least a portion of the spaces and indicia appearing on the other part so that when one part is folded over or under the other part along the serration the spaces will be matched or coinciding. When so folded the card parts may be simultaneously punched and separated from one another after the punching operation.

1 Claim, 8 Drawing Figures

CARD USED ON ELECTRONIC COMPUTER FOR RECORDING AND COLLECTION OF DATA INTENDED FOR BETTING CONTESTS AND SIMILAR CONTESTS

This invention relates to an improved punch card for use in the control, recording and collection of data primarily in connection with betting contests.

In certain countries, such as Brazil, a national betting system is in operation wherein certain data relating to a particular bet or bets is entered on a printed indicia bearing form overlaid on two separate standard type Hollerith punch cards, one referred to as the master card and the other as the receipt card. The printed form and each of the punch cards contain a number of identical spaces pertaining to the nature of the particular bet such as the winning team or teams, anticipated scores, the amount of the bet and the bettor's name and address. Before being distributed, the cards are punched separately on the left-hand side with codes for recording various control data.

The punching, interpretation and printing of the aforementioned codes consists of (a) punching the code for the State, City and dealer for verification digits and sequential numbering of the particular bet number; (b) interpretation of the above codes, except for the verification digits which are printed at the upper left of both master and receipt cards. Thus, punching, interpretation and printing are accomplished in two separate but identical operations; that is, one for the master and one for the receipt card. Following the punching, interpretation and printing which results in two groups of cards, the cards are sorted, checked, boxed and labeled for delivery to dealers. After the bets have been made, the printed form and the two punch cards are punched manually or otherwise to record the appropriate information. One of the cards, namely the master card, is retained by the dealer and the receipt card is retained by the bettor.

The primary object of the present invention is to eliminate two separate and identical code-punching operations and two separate and identical interpretation and printing operations and facilitate handling of the betting procedure by providing a card having a serrated or perforated line transversely thereof to permit folding one part of the card over or beneath the other to permit simultaneous punching of two cards.

A further object is to reduce the time and expense incident to the present system by eliminating duplicity of operations, conserving paper and storage space, reducing the amount of machinery required and conserving light and power.

The invention consists essentially of providing a punch card where, for example, the left hand side of the card is provided with spaces for punching codes for recording various control data as well as spaces for recording betting data, whereas the right hand side of the card is provided with a foldable and separable portion containing spaces identical to those appearing in the adjacent central portion of the card for recording betting data, the right hand side of the card being foldable so as to lie beneath the central portion so that both may be punched at the appropriate spaces simultaneously and the right hand side may be separated from the remainder of the card after the punching operation is completed. It is understood that the spaces for control data may appear on the right hand side of the card and the separable portion may be at the left hand side or the card could be made up with spaces for control data on both sides.

Referring to the drawings.

Similar reference characters are used to designate similar parts throughout the drawings.

Figure 1:
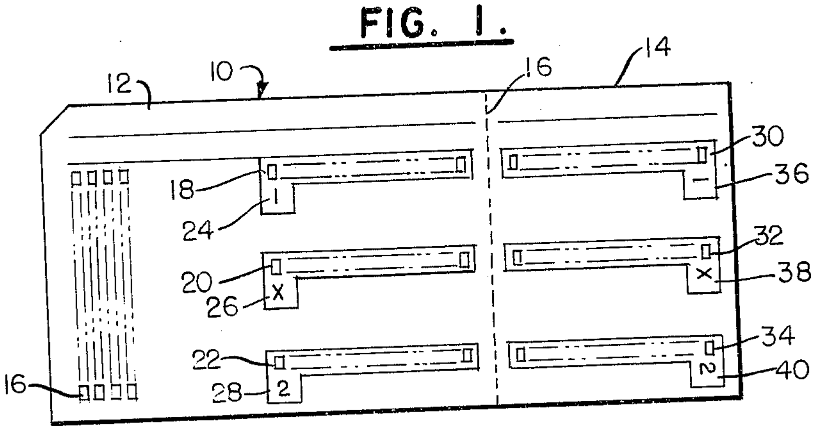
FIG. 1 is a plan view of a punch card according to the present invention.
Figure 2:
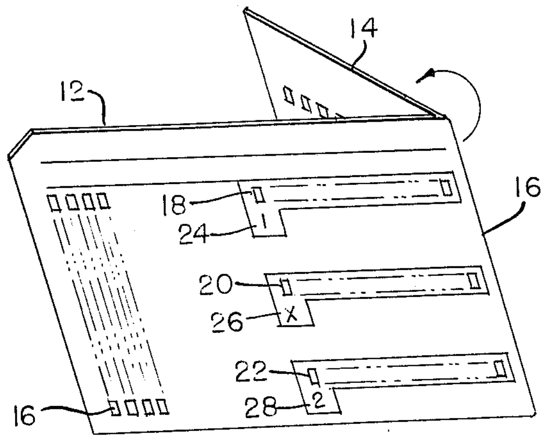
FIG. 2 shows the right hand side of the card being folded along a serrated area so as to underlie the control portion of the card preparatory to the punching operation.
Figure 3:
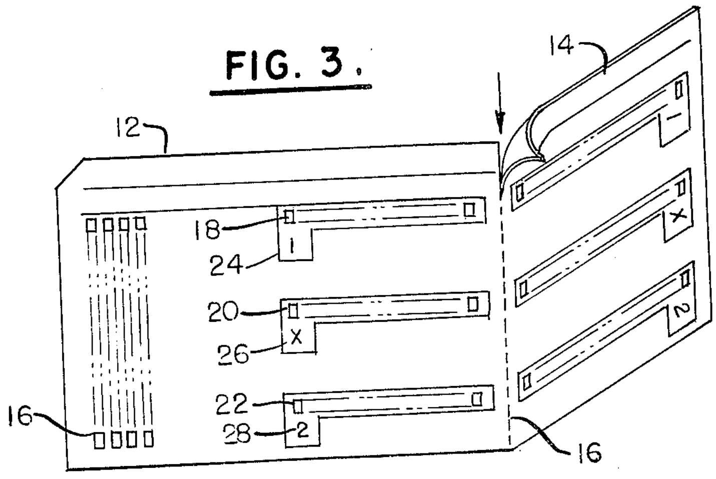
FIG. 3 shows the right hand side of the card being separated from the remainder of the card subsequent to the punching operation.
Figure 7:
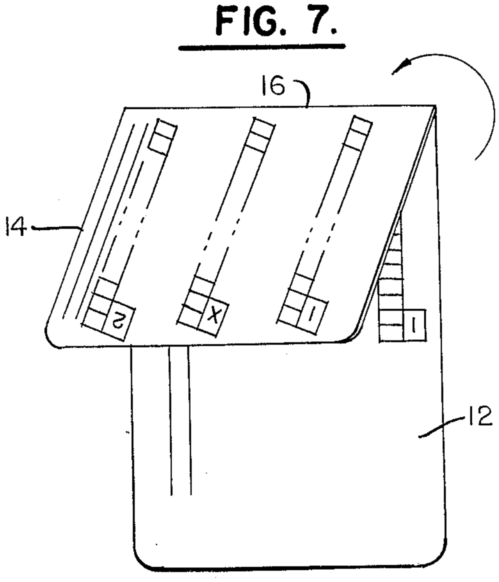
FIG. 7 shows the separable part of the card being folded in one direction relative to the main portion of the card.

Referring to the drawings in detail, FIG. 1 shows a typical card 10 which is the subject of the invention, comprising two parts 12 and 14 separated by a perforated or serrated line 16 to facilitate folding and separation of the two parts of the cards relative to one another. Part 12 has on its left hand side a group of columns 16 which are punched with codes for various control data such as the state, city and dealer identification. On the right hand side of part 12 of the card there are three rows 18, 20 and 22 of spaces in which information relating to a particular bet will ultimately be punched and also each row of spaces bears an identifying code letter or number such as 24, 26 and 28. The right hand side 14 of card 10 carries spaces 30, 32, 34, 36, 38 and 40 arranged so as to be a mirror image of their counterparts on part 12 of the card. Thus, when part 14 is bent along the serration 16 and folded under or over part 12 of the card as illustrated in FIGS. 2 and 7, the spaces 30, 32, 34 and code characters 36, 38 and 40 will exactly coincide with the corresponding spaces and code characters on part 12.

Figure 4:
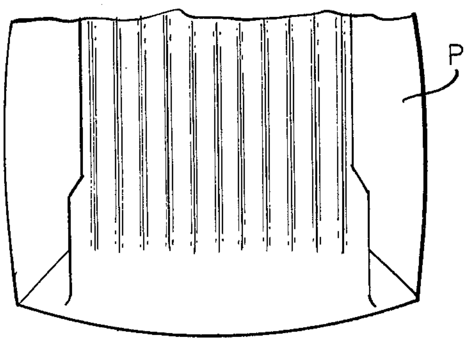
FIG. 4 is a diagrammatic view of a portion of a card punching device.
Figure 6:
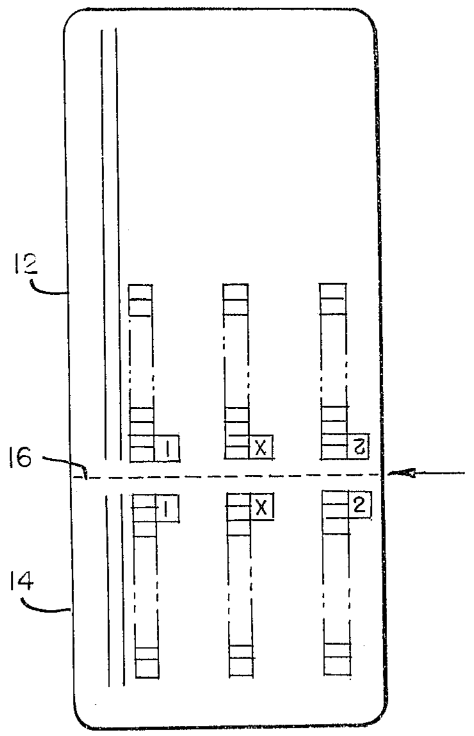
FIG. 6 shows a punch card where the serration is on the left hand side of the card.
Figure 5:
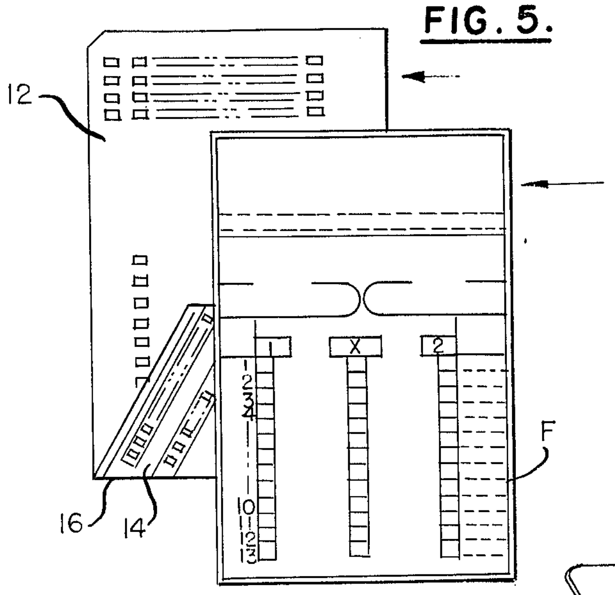
FIG. 5 shows a typical indicia bearing printed form such as is placed over a punch card with the right hand side in the process of being folded under the central portion.
Figure 8:
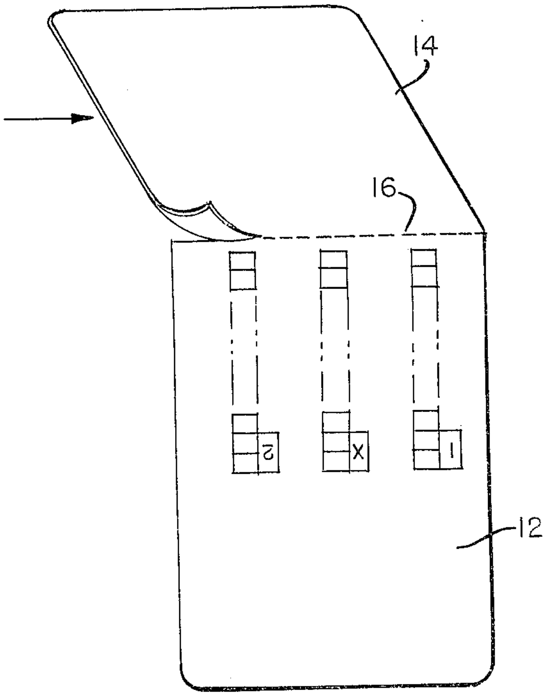
FIG. 8 shows the separable part of the card folded in the opposite direction from that shown in FIG. 7 with the parts of the card about to be separated.

When a bet is to be recorded, the printed form F, FIG. 5, is placed over part 12 of the card with part 14 in its folded under position. Form F is provided with betting information data and has rows of spaces and code characters identical to those of parts 12 and 14 of the card so that when the bet taker places the folded card and form, for example, in a punch device P as diagrammatically illustrated in FIG. 4 and punches the appropriate spaces, there will be duplicate cards bearing the coded betting information. The part 14 of the card is then detached and given to the bettor as a receipt for his bet. Part 12 of the card is retained by the dealer and used for control purposes at a computer center.

I claim:

1. A two part indicia bearing punch card for use in combination with an indicia bearing form for the recording of data, said card including a serration extending transversely thereof from one edge to the other to divide the card into first and second separable parts, said first part including a group of columns along its left hand edge which are pre-punched with control data information, the serration being sufficiently off-center so that when the card is folded along the serration the second part does not cover the columns of control data information, a plurality of rows of sapces in which information will ultimately be punched disposed beside said group of columns, each of said spaces bearing identifying indicia on one face of the unfolded card, the second one of said parts containing a mirror image of the spacing and arrangement of said plurality of rows of spaces and identifying indicia on said one face and in which information will be punched as appears on the first one of said parts, said indicia bearing form containing rows of spaces and identifying indicia identical to the rows of spaces and identifying indicia appearing on each of the separable parts of said card, whereby upon folding said second part over said first part and placing said indicia bearing form over said folded parts a single punching operation performed on said indicia bearing form and said card will simultaneously record the desired data on both parts of the card to provide a duplicate and separable information record.

* * * * *